UNITED STATES PATENT OFFICE.

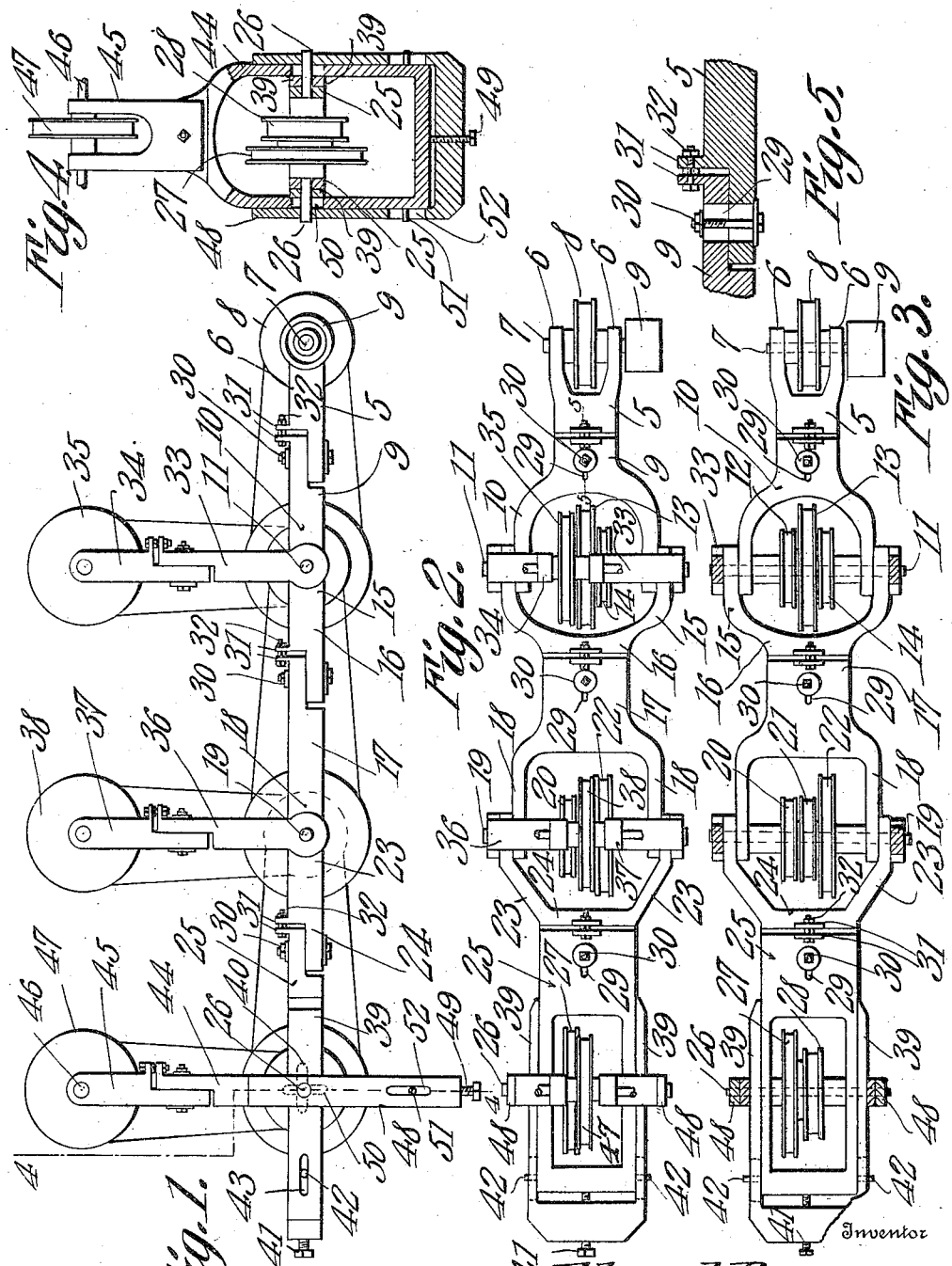

EDWARD RAWSON, OF ST. JOHNS, OREGON.

BELT-GEARING.

965,937.

Specification of Letters Patent. Patented Aug. 2, 1910.

Application filed October 7, 1909. Serial No. 521,508.

*To all whom it may concern:*

Be it known that I, EDWARD RAWSON, a citizen of the United States, residing at St. Johns, in the county of Multnomah and State of Oregon, have invented a new and useful Belt-Gearing, of which the following is a specification.

This invention has for its aim to provide in a belt gearing improved means for tightening any one of the belts without interfering with the others, and a further object is to provide a belt tightening mechanism which is simple in structure, the parts forming the mechanism being the supports of the several shafts of the pulleys constituting the gearing.

With the herein stated objects in view the invention consists in a novel construction and arrangement of parts to be hereinafter described and claimed, reference being had to the drawing hereto annexed in which, Figure 1 is an elevation of the gearing together with the belt tightening means constituting the present invention. Fig. 2 is a plan view. Fig. 3 is a plan view with the upper set of pulleys broken away. Fig. 4 is the vertical section on the line 4—4 of Fig. 1. Fig. 5 is the section on the line 5—5 of Fig. 2.

Referring to the drawing, there is shown at 5 a frame which is forked at one end, and in the branches 6 of this frame is journaled a shaft 7, on which are mounted pulleys 8 and 9, the former being grooved, and located between the branches. The other pulley is belted or otherwise connected to a suitable source of power.

To the frame 5 is connected a frame 9, which is also forked at one of its ends. In the branches 10 of the fork is journaled a shaft 11 carrying grooved pulleys 12, 13 and 14 between the branches. The pulley 13 is in line with the pulley 8, and is belted thereto. The shaft 11 is also journaled in the branches 15 of the forked end of a frame 16.

To the frame 16 is connected a frame 17, which is also forked at one end, and in the branches 18 of said end is journaled a shaft 19 carrying grooved pulleys 20, 21 and 22 between the branches. The pulley 22 is in line with the pulley 14 and is belted thereto. The shaft 19 is also journaled in the branches 23 of the forked end of a frame 24.

The frame 24 is connected to a frame 25 carrying a shaft 26, provided with grooved pulleys 27 and 28, the former of which is belted to the pulley 20.

The several frame members herein described are halved at their abutting ends, and they are also adjustably connected by slotting the halved ends thereof as indicated at 29, and passing bolts therethrough, secured by nuts 30. The adjacent ends are also formed with opposite ears 31, having registering openings through which are passed bolts 32 secured by nuts, said bolts being provided for adjusting the frame members upon loosening the nuts 30.

On the shaft 11 is mounted a forked frame 33 connected to a second forked frame 34 carrying a grooved pulley 35 which is belted to the pulley 12.

On the shaft 19 is mounted a forked frame 36 connected to a forked frame 37 carrying a grooved pulley 38 which is belted to the pulley 21.

The frame members carrying the pulleys 35 and 38 are each adjustably connected in the same manner as the frame members carrying the lower set of pulleys, so that the belt connecting the pulleys 35 and 12, and 38 and 21 may be tightened.

The frame 25 is straddled on opposite sides by the branches 39 of a yoke, said branches being slotted as indicated at 40 to receive the shaft 26. An adjusting screw 41 threaded through the end of the yoke, and bearing against the end of the frame 25, holds the same in adjusted position. Upon operating the screw, the relative positions of the frame and the yoke may be changed, whereby the tension of the belt connecting the pulleys 27 and 20 is adjusted. The frame 25 also carries guide pins 42 working in slots 43 made in the branches 39 of the yoke.

The shaft 26 carries a frame 44 located outside of the yoke branches 39, said frame carrying at its upper end an adjustable frame member 45, similar to the members 34 and 37. In the frame 45 is journaled a shaft 46 on which is mounted a grooved pulley 47 which is belted to the pulley 28. The lower end of the frame 44 is straddled on opposite sides by the branches 48 of a yoke carrying an adjusting screw 49, adapted to be screwed against the lower end of the frame 44 for the purpose of adjusting the tension of the belt connecting the pulleys 47 and 28. The frame 44 is slotted as indicated at 50 to receive the shaft 26, and it also carries guide pins 51 working in slots 52 in the yoke branches 48.

By mounting and connecting the various frame members as herein described, each belt may be adjusted independently, and the adjustment of one will not affect or interfere with the others. The belt connecting the pulleys 8 and 13 is adjusted by varying the relative position of the frames 5 and 9. The belt connecting the pulleys 14 and 22 is adjusted by varying the relative position of the frame members carrying the shafts of said pulleys. The belt connecting the pulleys 20 and 27 may be adjusted by varying the relative positions of the frame members 24 and 25, or by operating the set screw 41. The belt connecting the pulleys 28 and 47 is adjusted by the set screw 49. The belt connecting the pulleys 21 and 38 is adjusted by the frame members 36 and 37. The belt connecting the pulleys 12 and 35 is adjusted by the frame members 33 and 34.

The supporting frames of the upper set of pulleys 35, 38 and 47 are loose on the shafts 11, 19 and 26, and therefore may be swung on said shafts, and thus adjusted to occupy different positions with respect to the lower set of pulleys. By thus mounting the supporting frames of the upper set of pulleys, the herein described adjustment of the frame members carrying the shafts 11, 19 and 26 may be made without affecting the tension of the belts passing over the pulleys, the herein described adjustment of upper set of pulleys will be suitably connected to the parts to be driven.

The invention is not limited to the particular form of pulleys shown. Flat pulleys may be provided, and the invention may be also applied to a sprocket and chain gearing.

What is claimed is:

The combination of a slotted frame, a pulley carried by the frame, a yoke straddling the frame, and having slots in its branches, a shaft passing through the branches of the yoke, and through the slots of the frame, said frame and yoke being free to swing on said shaft, a pulley mounted on the shaft, a belt connecting the pulleys, an adjusting screw carried by the yoke, and engageable with one end of the frame, and pins carried by the frame, and extending into the slots of the yoke branches.

In testimony that I claim the foregoing as my own, I have hereto affixed my signature in the presence of two witnesses.

EDWARD RAWSON.

Witnesses:
L. B. WILSON,
GEO. L. EPPS.